United States Patent [19]
Constable et al.

[11] Patent Number: 5,870,639
[45] Date of Patent: *Feb. 9, 1999

[54] OPTICAL DATA RECORDING CIRCUIT FOR A PHOTOGRAPHIC CAMERA

[75] Inventors: Douglas W. Constable, Rochester; David C. Smart, Fairport, both of N.Y.

[73] Assignee: Eastman Kodak Company, Rochester, N.Y.

[ * ] Notice: The term of this patent shall not extend beyond the expiration date of Pat. No. 5,619,737.

[21] Appl. No.: 822,094

[22] Filed: Mar. 20, 1997

Related U.S. Application Data

[63] Continuation of Ser. No. 610,645, Mar. 4, 1996, abandoned.

[60] Provisional application No. 60/001,678, Jul. 31, 1995.

[51] Int. Cl.[6] .............. G03B 17/24; G03B 15/03; G03B 3/00
[52] U.S. Cl. .............. 396/315; 396/205; 396/303
[58] Field of Search .................. 396/155, 156, 396/180, 205, 206, 6, 160, 301, 303, 310, 311, 315, 316, 317, 318

[56] References Cited

U.S. PATENT DOCUMENTS

| | | | |
|---|---|---|---|
| 4,085,412 | 4/1978 | Yoshino | 396/315 |
| 4,112,444 | 9/1978 | Yonemoto et al. | 396/315 |
| 4,140,378 | 2/1979 | Suzuki et al. | 396/281 |
| 4,174,165 | 11/1979 | Hohda et al. | 396/205 |
| 4,181,416 | 1/1980 | Ohtaki et al. | 396/315 |
| 4,183,646 | 1/1980 | Tsunefuji | 396/452 |
| 4,235,544 | 11/1980 | Yamada et al. | 396/315 |
| 4,323,305 | 4/1982 | Satoh | 396/315 |
| 4,332,445 | 6/1982 | Hosono | 396/205 |
| 4,362,369 | 12/1982 | Kazami et al. | 396/315 |
| 4,656,574 | 4/1987 | Salchli | 363/60 |
| 4,973,997 | 11/1990 | Harvey | 396/315 |
| 5,249,007 | 9/1993 | Tanaka | 396/155 |
| 5,471,265 | 11/1995 | Shibata et al. | 396/315 |
| 5,486,885 | 1/1996 | Matsumoto | 396/315 |
| 5,519,463 | 5/1996 | Nakamura et al. | 396/315 |
| 5,619,737 | 4/1997 | Horning et al. | 396/315 |

*Primary Examiner*—Safet Metjahic
*Assistant Examiner*—Nicholas J. Tuccillo
*Attorney, Agent, or Firm*—Francis H. Boos, Jr.

[57] ABSTRACT

Data bits representing different aspect ratio formats of film image frames are optically recorded on photographic film by means of light emitting devices energized from the flash charge storage capacitor. The light emitting devices are driven by a constant current source control circuit, the control circuit and light emitting devices being coupled to the capacitor by the flash sync switch. Data bit format selection is achieved by either user operated light emitting device selection switches or by means of an optical bit forming mask having plural aperture selectable by means of a movable slide shutter.

5 Claims, 2 Drawing Sheets

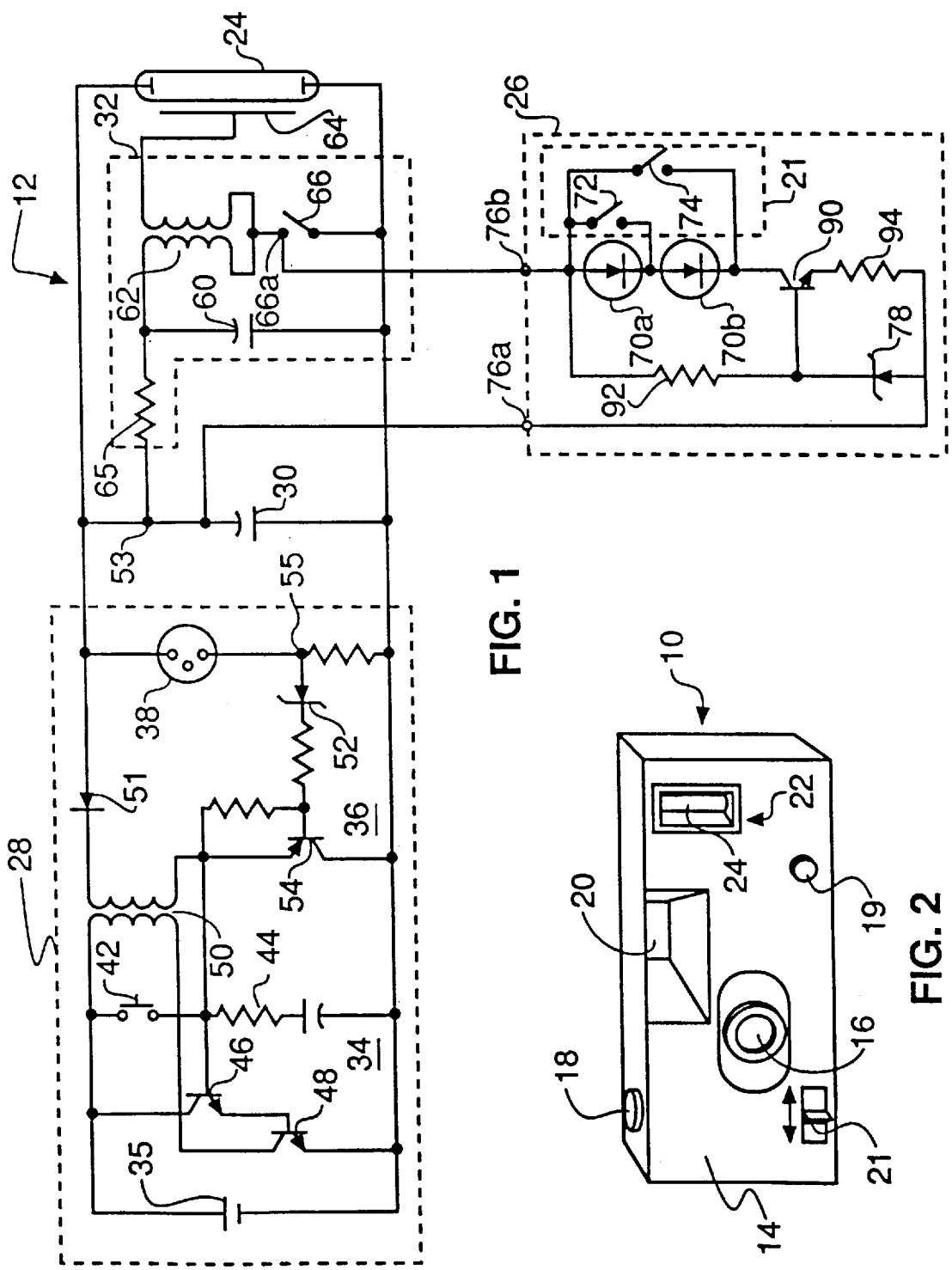

OPTICAL DATA RECORDING CIRCUIT FOR A PHOTOGRAPHIC CAMERA

CROSS-REFERENCE TO RELATED APPLICATIONS

This is a continuation of application Ser. No. 08/610,645, filed Mar. 4, 1996, now abandoned on which a claim of priority was made to Provisional Application Ser. No. 60/001,678, filed Jul. 31, 1995.

FIELD OF THE INVENTION

The invention relates generally to the field of photography, and in particular to a circuit for optically imprinting data on photographic film in a camera.

BACKGROUND OF THE INVENTION

It is known to operate a photographic camera in such a way that the camera user can select different aspect ratios of prints to be produced from exposed image frames on the film. It is desirable to record data on the film associated with each image frame which indicates this print aspect ratio for each respective frame. This recorded data can then be read appropriately at the photoprinter to automatically set the print conditions that will produce a print with the selected aspect ratio. The data may be magnetically recorded on a magnetic layer formed on the film or optically as a latent image marks exposed on the film emulsion. In a recently proposed photographic system, the print aspect ratio data is recorded as one or more latent image blips, colloquially referred to as fat bits, along the margin of the film adjacent each exposed image frame. Such a system is illustrated in FIG. 3 which shows a film strip 80 having spaced apart pairs of perforations 81,83 which delineate regularly spaced image regions F on the film strip. Within the image regions F, a sequence of exposed image frames 82 are shown in dotted outline with the respective different print aspect ratios shown by solid lines. Frame 82H has an aspect ratio of approximately 1:2, similar to that of a high definition television image; frame 82P has an elongated panoramic aspect ratio of approximately 1:3; and frame 82L has the aspect ratio of 2:3 found in present day 35 mm film formats. In the proposed system, defined zones along the film margin, indicated by dotted outlines 84, are reserved for recording of the latent image fat bits. As illustrated in the drawing, the absence of any recorded fat bits indicates a 1:2 print aspect ratio frame 82H. A single recorded fat bit in the zone 84 indicates a panoramic print aspect ratio frame 82P; and a pair of fat bits in the zone indicates a 2×3 print aspect ratio frame 82L.

When using optical data recording of fat bits on film, it is desirable to use light emitting devices (LED) as opposed to, for example, incandescent devices because of the comparatively lower cost of LED devices. One difficulty with the use of LED's is that they require a minimum voltage energy source to operate, typically 1.8 v to 2.2 v. In more expensive cameras that typically use 3 v lithium batteries, this is not a problem. Lower cost cameras are common that use a single AA battery that produces 1.5 v, the currently popular single use camera being a typical example of such. There is a need, therefore, to provide an energy source to operate light emitting devices that have voltage source requirements exceeding the 1.5 v battery voltage levels typically encountered in low cost cameras.

SUMMARY OF THE INVENTION

In accordance with the invention therefore, there is provided an optical data recording circuit for use in a flash camera of the type having an energy supply circuit, a flash tube, a flash charge storage capacitor and a flash trigger circuit with a sync switch, wherein the data recording circuit comprises light emitting means for exposing images on photographic film in the camera and selection means for selectively exposing said light emitting means to said film to form latent image data bits on the film. The recording circuit further comprises an energy supply control circuit coupled to said light emitting means and to said flash charge storage capacitor and being responsive to closure of said sync switch for applying stored charge energy from said flash capacitor to said light emitting means to generate light emission for recording data bits on the film. Preferably, the light emitting means comprises one or more LED's and the energy supply control circuit comprises a constant current source circuit to maintain a constant current through the LED's irrespective of the voltage applied thereto from the flash capacitor.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the drawings:

FIG. 1 is a circuit diagram of a camera flash circuit and of an optical data recording control circuit of the present invention;

FIG. 2 is a diagramatic illustration of a single use camera in which the present invention is particularly useful;

DETAILED DESCRIPTION OF THE INVENTION

Figure 3:
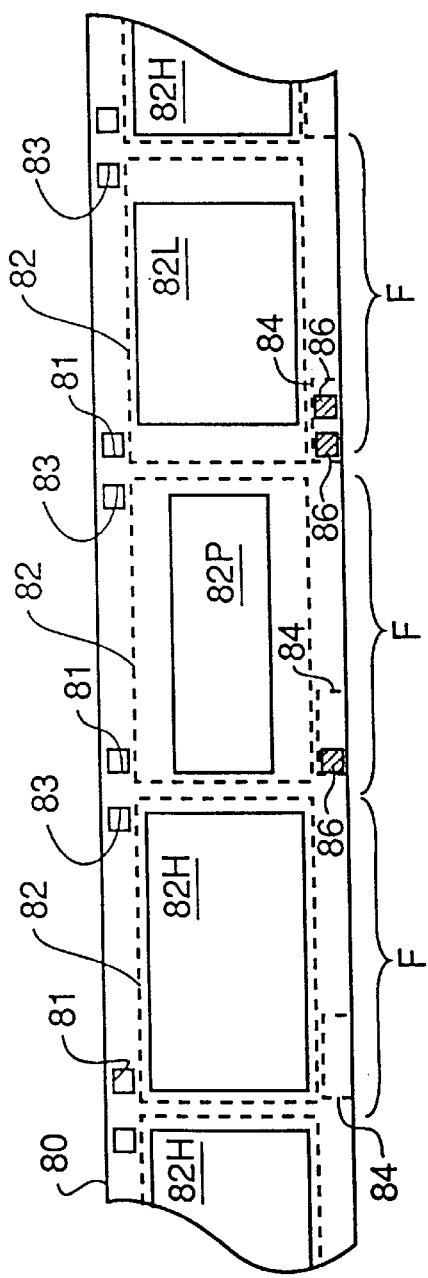
FIG. 3 is an illustration of a film strip showing image frames of differing aspect ratios along with optically recorded data indicating the respective aspect ratios.

Referring now to the drawings, a preferred embodiment of the optical data recording circuit invention is depicted in FIG. 1 for use in an inexpensive, single use camera 10 as shown in FIG. 2. The camera includes a body 14, a taking lens 16, a shutter actuating button 18 and flash charging button 19, a viewfinder 20 and a flash device 22 including a flash tube 24. The camera body 14 is adapted to receive and locate photographic film in a predetermined exposure position relative to the other camera components. Shutter actuator button 18 initiates a sequence which exposes the film through optical system 16 with supplemental illumination from flash device 22. Button 19 initiates a flash charging cycle prior to the exposure sequence. The camera is pointed at the intended subject with the aid of viewfinder 20. A switch 21 is provided for selection by the camera user of image frame aspect ratio data to be recorded on the film as will be described in more detail below.

Referring now specifically to FIG. 1, there is shown a flash circuit 12, of known configuration, along with the optical data recording circuit 26 of the invention. The flash circuit 12 includes a flash energy supply circuit 28, a flash charge capacitor 30, a flash trigger circuit 32 and flash tube 24. Flash energy supply circuit 28 comprises a battery 35, a self-oscillating flash charging circuit 34, and an oscillation arresting circuit 36. A neon indicator bulb 38 provides a visual indication of when charge capacitor 30 has reached a sufficiently high charge to operate the flash tube 24.

Operation of the self-oscillating charging circuit 34 begins when flash charging button is depressed. This effects closing of momentary switch 42, thereby establishing current flow from battery 35 through resistor 44 to the bases of high gain transistors 46 and 48 thereby initiating current flow through the primary winding of charging transformer 50. The induced stepped up voltage in the secondary winding of transformer 50 is fed back to the base of transistor 46 to continue the current flow in the primary winding. When the transformer saturates, the current flow in the secondary winding reverses turning off the base current in transistor 46 thereby completing a cycle of oscillation. Noise in the base of transistor 46 caused by the changing field in the secondary of transformer 50 is sufficient to initiate conduction in transistor 46 thereby starting the cycle over again. Transistors 46 and 48 provide enough loop gain to sustain the oscillations whether momentary switch 42 is open or closed. The oscillatory current flow in the secondary of transformer 50 is rectified by diode 51 and charges the flash charge capacitor to a negative voltage at terminal 53.

Charging of flash charge capacitor 30 continues iuitil the self oscillation of circuit 34 is terminated by the operation of oscillation arresting circuit 36 which includes 110 v zener diode 52 and PNP transistor switch 54. When the voltage across capacitor 30 reaches −270 v at terminal 53, neon ready light 38 begins to conduct, illuminating the ready light and providing notification to the user there is sufficient charge on flash capacitor 30 to initiate an exposure sequence. When neon light 38 conducts, the voltage drop thereacross falls to 220 v leaving a voltage of −70 v at terminal 55. Charging of capacitor 30 continues until the voltage at terminal 53 reaches −330 v. When the flash capacitor 30 is thus fully charged, zener diode 52 begins to conduct, applying current to the base of transistor 54, thereby switching transistor 54 on. This grounds the base of transistor 46 in the self-oscillating charging circuit 34 thereby arresting the self oscillations and terminating further charging of capacitor 30.

Flash triggering circuit 32 is conventional and its operation is well known. Briefly, the circuit 32 includes a triggering capacitor 60, transformer 62, a flash tube triggering electrode 64 and a flash sync switch 66. In operation, sync switch 66 is closed by the camera shutter mechanism at the proper time in the exposure sequence. Capacitor 60 discharges through the primary windings of transformer 62, inducing a high voltage on triggering electrode 64 which ionizes the gas in flash discharge tube 24. Flash capacitor 30 then discharges through the flash tube 24, exciting the gas and producing the desired flash illumination. A high valued isolation resistor 65 is provided to maintain the dc charge voltage across trigger capacitor 60 at the same level as flash charge capacitor 30 while minimizing current drain on capacitor 30 during the flash trigger operation.

Having described the flash circuit 12, there will now be described the optical data recording circuit 26 of the invention. Circuit 26 comprises light emitting means, including series connected LED's 70a,70b and switch means 21, for selectively recording latent image data on photographic film in the camera 10. Switch means 21 is provided with switches 72 and 74 connected across the LED's such that one, both or none of the LED's is shunted via selective closure of the switches. As shown in FIG. 1, when both switches are open, neither LED is shunted while closure of switch 72 shunts LED 70a and closure of switch 74 shunts both LED's 70a and 70b. The LED's are connected at one end via input terminal 76b to the normally open contact 66a of sync switch 66 and at the other end via transistor 90, resistor 94 and input terminal 76a to terminal 53 at the charge potential side of flash capacitor 30. A 12 v zener diode 78 is coupled across resistor 94 and the base-emitter junction of transistor 90 to form a constant current source for the LED's. A current bypass resistor 92 is coupled from the base of transistor 90 to input terminal 76b. In operation, when sync switch 66 is closed, input terminals 76a,76b of circuit 26 are coupled directly across flash capacitor 30 to momentarily apply the charge voltage from the capacitor to the circuit 26. Current flows through resistor 92 and zener diode 78, establishing a fixed 12 v bias potential at the base of transistor 90 with respect to terminal 76a. This fixed bias potential establishes a constant collector-emitter current through transistor 90 and resistor 94 which is independent of the voltage on flash capacitor 30. This constant current flows through one, both or neither of the LED's dependent on the setting of the switches 72,74 in switch means 21. Since sync switch 66 is closed only momentarily, on the order of 100 milliseconds, the discharge current diverted from flash capacitor 30 through data recording circuit 26 is negligible and does not interfere with flash operation. Moreover, the use of the flash capacitor 30 as a voltage source for the data recording circuit is valid even when there is insufficient charge voltage on the capacitor to fire the flash tube 24 since, after a flash event, there is a residual voltage across the capacitor of approximately 50 v. Furthermore, it takes days for the flash capacitor voltage to bleed down. In practice, with the 12 v zener diode, a voltage from the flash capacitor 30 of as little as 10 volts applied to input terminals 76a,76b would be sufficient to provide enough current through the diode into the base of transistor 90 to initiate a flash of light emission from the LED's 70a,70b. Also, when the flash capacitor charging circuit 28 is first started, the capacitor 30 has enough voltage built up in less than one second for operation of the data recording circuit 26 even following long periods of non-use in which the flash capacitor has bled down to a zero charge voltage.

Figure 4:
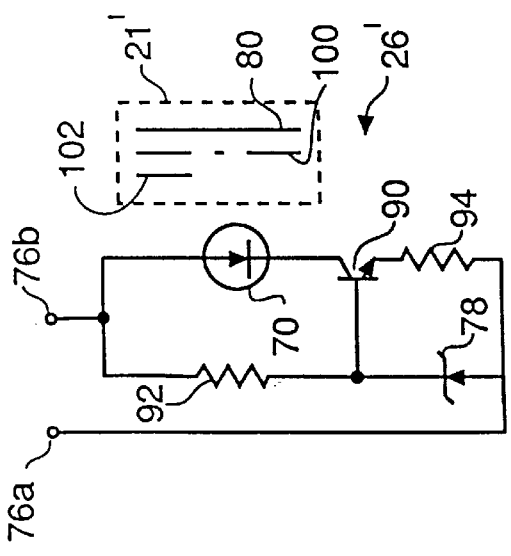
FIG. 4 is an alternative embodiment of the data recording circuit of the invention.

FIG. 4 shows an alternative embodiment of the data recording circuit utilizing a single LED 70. The selection of the optically recorded data bits on the film 80 is made by a modified switch means 21' comprising a two aperture mask 100 and a movable mask selector slide 102 which may be coupled to the exterior slide switch 21 (FIG. 2). The remainder of the data recording circuit is the same as that described above.

Figure 5:
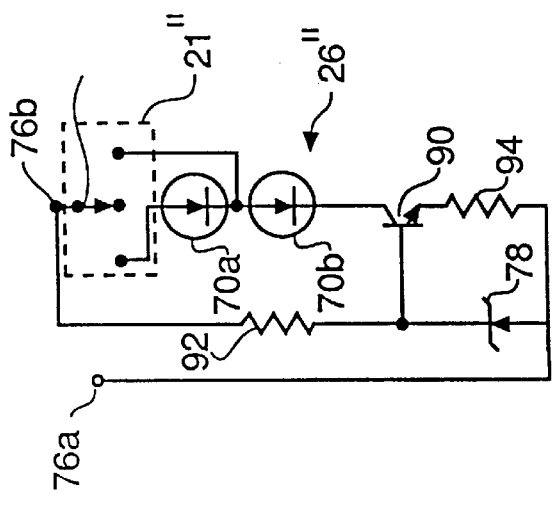
FIG. 5 is another alternative embodiment of the data recording circuit of the invention.

FIG. 5 is yet another embodiment of the data recording circuit utilizing dual LED's 70a,70b similar to the circuit of FIG. 1. The switch means 21" differs however in utilizing a three position switch 104 to provide the selective recording of the fat bits on the film.

It will be appreciated that what has been described is a low cost optical data recording circuit that accomplishes the necessary selective optical recording data bits on film with a minimum of low cost components and that takes advantage of an existing energy source in the camera, i.e. the flash capacitor, without modification and without degradation of flash operating performance.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | camera |
| 12 | flash circuit |
| 14 | camera body |
| 16 | taking lens |
| 18 | shutter actuating button |
| 19 | flash charging button |
| 20 | viewfinder |
| 22 | flash device |
| 24 | flash tube |
| 26 | optical data recording circuit |
| 28 | flash energy supply circuit |
| 30 | flash charge capacitor |
| 32 | flash trigger circuit |
| 34 | self oscillating flash charging circuit |
| 35 | battery |
| 36 | oscillation arresting circuit |
| 38 | neon indicator bulb |
| 42 | momentary switch |
| 44 | resistor |
| 46 | NPN transistor |
| 48 | NPN transistor |
| 50 | charging transformer |
| 51 | rectifier diode |
| 52 | 110 v zener diode |
| 54 | transistor switch |
| 60 | trigger capacitor |
| 62 | trigger transformer |
| 64 | flash tube trigger electrode |
| 65 | isolation resistor |
| 66 | flash sync switch |
| 70a, b | light emitting dioides (LED) |
| 72, 74 | LED selection switches |
| 76 | input terminals |
| 78 | 12 v zener diode |
| 80 | film strip |
| 82 | image frames |
| 84 | optical data bit recording zones |
| 86 | optical data (fat) bits |
| 90 | PNP transistor |
| 92 | current bypass resistor |
| 94 | constant current resistor |
| 100 | data recording mask |
| 102 | mask selector slide |

What is claimed is:

1. An optical data recording circuit for use in a flash camera having an energy supply circuit, a main flash tube for providing scene flash illumination, a flash charge storage capacitor for providing energy to said main flash tube and a flash trigger circuit with a sync switch, the data recording circuit comprising:

light emitting means for exposing images on photographic film in the camera;

selection means for selectively exposing said light emitting means to said film to form latent image data bits on the film; and an energy supply control circuit coupled to said light emitting means and to said flash charge storage capacitor and responsive to closure of said sync switch for applying stored charge energy from said flash capacitor to said light emitting means to stimulate light emission for recording data bits on the film.

2. The optical data recording circuit of claim 1 wherein said light emitting means includes at least one light emitting diode and said control circuit comprises a constant current source for maintaining a constant current through said at least one light emitting diode for the duration of application of energy thereto from said flash charge storage capacitor.

3. The optical data recording circuit of claim 2 wherein said control circuit comprises a transistor having a collector, emitter and base, and a base bias network including a zener diode for maintaining a constant bias voltage on the transistor base while energy from the flash charge storage capacitor is applied thereto, said at least one light emitting diode being coupled in circuit between said sync switch and said transistor collector.

4. The optical data recording circuit of claim 1 wherein said light emitting means includes a plurality of light emitting diodes and said selection means comprises switches for selectively shunting said light emitting diodes to establish said data bits for recording on the photographic film.

5. The optical data recording circuit of claim 1 wherein said light emitting means comprises a single light emitting diode and said selection means comprises a mask and movable slide for selecting a format for said data bits recorded on the photographic film.

* * * * *